(12) United States Patent
Rutterman et al.

(10) Patent No.: US 6,449,412 B1
(45) Date of Patent: Sep. 10, 2002

(54) FIBER OPTIC RIBBON INTERCONNECT CABLE

(75) Inventors: Daniel J. Rutterman; Ronald D. Schiefer, both of Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/107,676

(22) Filed: Jun. 30, 1998

(51) Int. Cl.[7] .................................................. G02B 6/44
(52) U.S. Cl. ....................... 385/103; 385/100; 385/106; 385/114
(58) Field of Search ............................... 385/100, 102, 385/103, 106, 107, 114

(56) References Cited

U.S. PATENT DOCUMENTS

| | | | |
|---|---|---|---|
| 4,199,225 A | | 4/1980 | Slaughter et al. ............ 385/114 |
| 4,715,677 A | * | 12/1987 | Saito et al. .................. 385/102 |
| 4,787,702 A | * | 11/1988 | Khalil ........................ 385/102 |
| 5,062,685 A | * | 11/1991 | Cain et al. ................... 385/102 |
| 5,481,069 A | | 1/1996 | Andresen et al. ............ 174/117 |
| 5,621,842 A | * | 4/1997 | Keller ......................... 385/114 |
| 5,627,932 A | * | 5/1997 | Kiel et al. ................... 385/107 |
| 5,675,686 A | | 10/1997 | Rosenmayer et al. ....... 385/114 |
| 5,802,231 A | * | 9/1998 | Nagano et al. .............. 385/114 |
| 5,966,489 A | * | 10/1999 | Harwell et al. ............. 385/114 |
| 5,970,196 A | * | 10/1999 | Greveling et al. .......... 385/114 |
| 6,097,866 A | | 8/2000 | Yang et al. .................. 385/114 |
| 6,327,409 B1 | | 12/2001 | Chabot et al. ............... 385/114 |

FOREIGN PATENT DOCUMENTS

| | | | |
|---|---|---|---|
| EP | 0418094 A2 | 9/1990 | ............ G02B/6/44 |
| EP | 0764863 A1 | 3/1997 | ............ G02B/6/44 |
| GB | 2096343 A | 4/1981 | ............ G02B/5/14 |
| GB | 2185828 A * | 7/1987 | ................. 385/114 |
| GB | 2215081 A * | 9/1989 | ................. 385/103 |
| JP | 58-211713 * | 12/1983 | |
| JP | 0098308 * | 5/1986 | ................. 385/106 |
| JP | 61-98308 A | 5/1986 | ............ G02B/6/44 |
| JP | 0175813 * | 7/1988 | ................. 385/114 |
| JP | 0137810 * | 5/1990 | ................. 385/114 |
| JP | 4-75008 * | 3/1992 | |
| JP | 406201956 A * | 7/1994 | ................. 385/100 |

(List continued on next page.)

OTHER PUBLICATIONS

Ribbon Interconnect Data Cable Advertisement, 1996 Alcoa Fujikura Ltd.
Miniature Optical Tabe Cords with 8–Fiber Ribbon Publication, 1996 with translation M. Tachikura, et al.
Flex–Lite®—High Reliability Fiber Optic Interconnects Article, 1996, W. L. Gore & Assoc.

*Primary Examiner*—Cassandra Spyrou
*Assistant Examiner*—John Juba, Jr.
(74) *Attorney, Agent, or Firm*—Timothy J. Aberle

(57) ABSTRACT

A fiber optic cable comprising an optical ribbon (20), a jacket (40), and a buffer material (30) between the optical ribbon (20) and the jacket (40). Buffer material (30) includes at least one volume of buffer material defining a stress-cushioning zone (32) between optical ribbon (20) and jacket (40), the stress-cushioning zone being operative to substantially decouple jacket (40) from ribbon (20) in the region of the stress-cushioning zone (32) thereby inhibiting the application of stress to optical ribbon (20). Buffer material (30) includes at least one volume of material at an intermediate buffer zone (35) held substantially tight against an intermediate portion (25) of optical ribbon (20) for inhibiting the twisting of optical ribbon (20). The volume of material at the stress-cushioning zone (32) is substantially larger than the volume of the buffer material of the intermediate buffer zone (35). Where buffer material (30) comprises tensile strength fibers, the fibers perform the dual functions of tensile strength and lateral stress-cushioning.

47 Claims, 2 Drawing Sheets

FOREIGN PATENT DOCUMENTS

| | | | | |
|---|---|---|---|---|
| JP | 07146427 | 6/1995 | ............ | G02B/6/44 |
| JP | 08062461 A | 3/1996 | ............ | G02B/6/44 |
| JP | 08062466 | 3/1996 | ............ | G02B/6/44 |
| JP | 08184734 A | 7/1996 | ............ | G02B/6/44 |
| JP | 08201671 A | 8/1996 | ............ | G02B/6/44 |
| JP | 08262292 A | 10/1996 | ............ | G02B/6/44 |
| JP | 08327861 | 12/1996 | ............ | G02B/6/44 |
| JP | 09159886 A | 6/1997 | ............ | G02B/6/44 |
| JP | 09197215 A | 7/1997 | ............ | G02B/6/44 |
| JP | 10-142462 | 5/1998 | ............ | G02B/6/44 |
| JP | 10142462 | 5/1998 | ............ | G02B/6/44 |

* cited by examiner

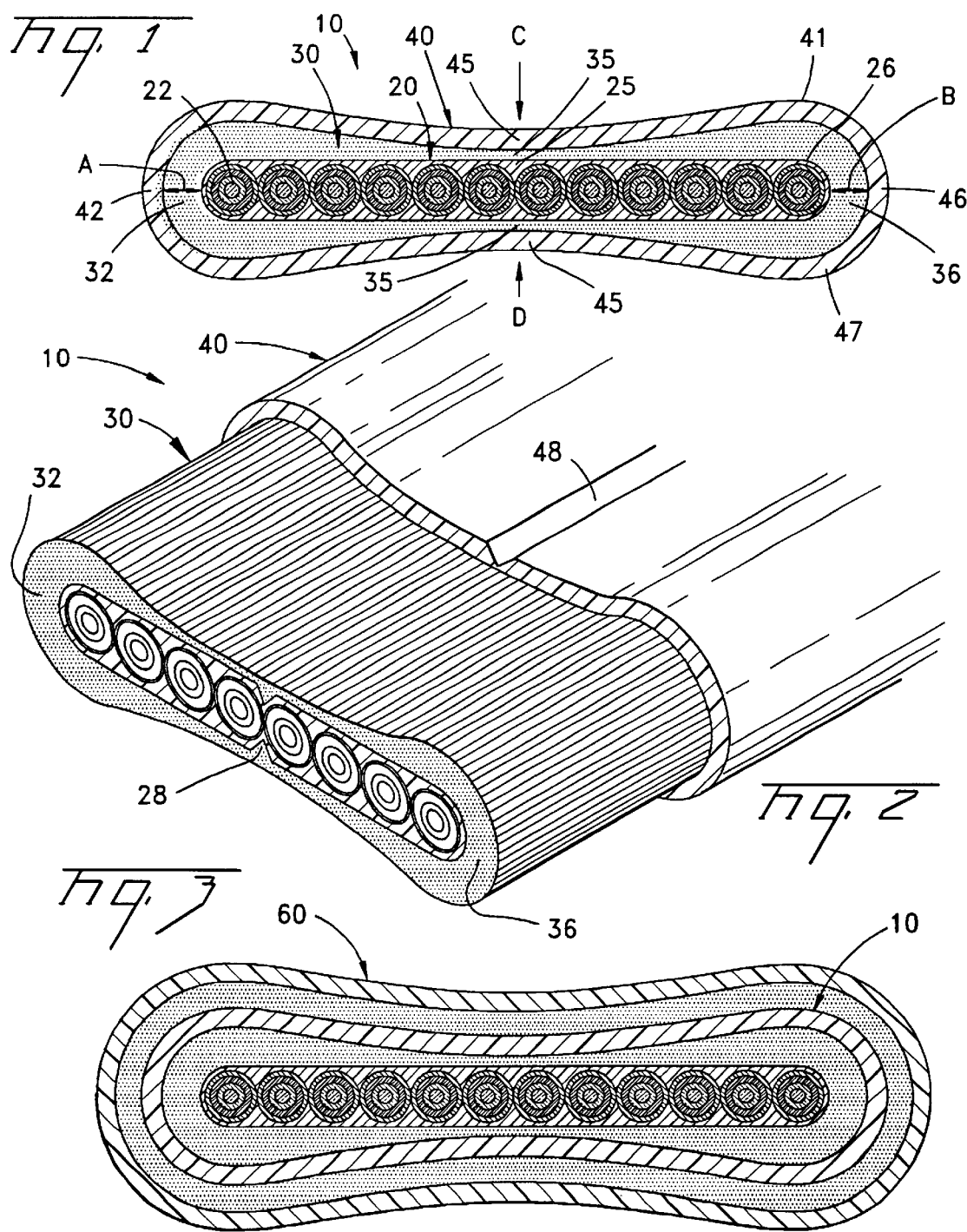

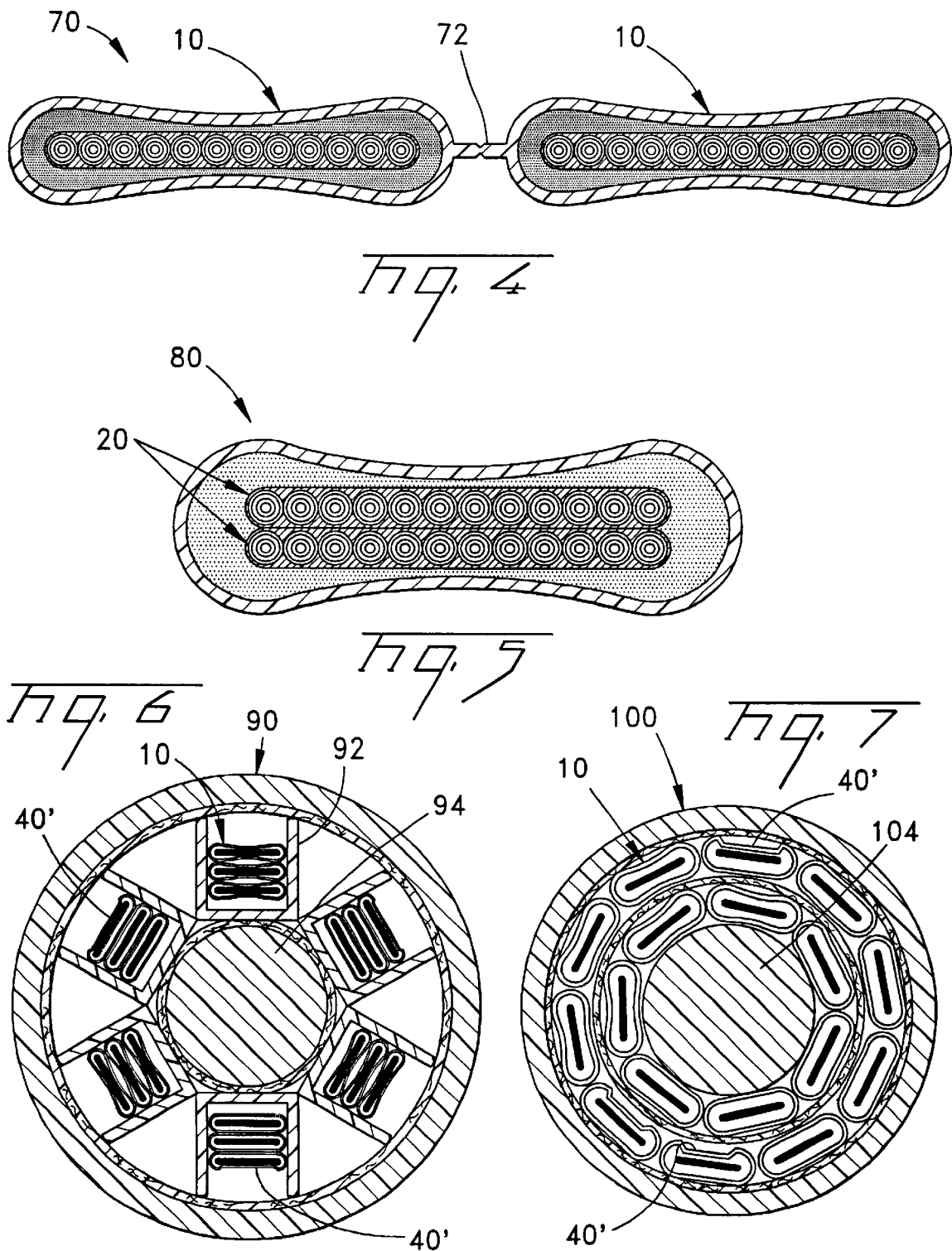

FIBER OPTIC RIBBON INTERCONNECT CABLE

The present invention relates to a fiber optic cable having at least one optical fiber ribbon therein.

BACKGROUND OF THE INVENTION

Conventional fiber optic cables may include optical fiber ribbons having coated glass optical fibers that are used to transmit voice, video, and data information. The optical ribbons typically include a UV-curable common matrix coating that surrounds the optical fibers. In a typical method of manufacturing an optical ribbon, the common matrix coating is extruded about a group of optical fibers that have been arranged in a planar array. The common matrix coating is then irradiated with a UV light source which cures it, thereby fixing the relative positions of the fibers in the planar array. Indoor and outdoor fiber optic cables may include one or more optical cable sub-units in the form of an optical ribbon surrounded by tensile strength members and a jacket.

U.S. Pat. No. 5,253,318 discloses examples of optical cable sub-units that include a layer of uniformly distributed PTFE-buffer material of essentially constant thickness, polyester insulation, braided aramid sheath or aramid cloth, and a fire retardant jacket. More particularly, the sub-unit has layers including: polymer coated optical fibers arranged parallel to each other; a layer of porous expanded PTFE, each side of which is coated by an adhesive; at least one layer of a polyester tape coated on at least its inner side with a polyester adhesive layer; a braided sheath of aramid fibers; a layer of tape-wrapped binder tape; and a flame retardant jacket. The various thermoplastic layers/adhesives of the foregoing sub-unit make it expensive and difficult to manufacture. Additionally, the optical fibers thereof may experience an unacceptable level of attenuation as a result of stress acting on the optical fibers during cable bending or temperature cycling.

Attenuation bears upon the performance of an optical cable. Attenuation indicates a degradation in optical performance due to a loss in power from one point to another along an optical fiber, and it may be caused by microbending or macrobending of the optical fiber. A delta attenuation is the change in attenuation that a modified optical fiber experiences as compared to a reference attenuation measurement of the optical fiber in a pre-modified state. Where an optical cable is bent, microbending and/or macrobending may occur in the optical fibers therein resulting in an unacceptably high delta attenuation.

OBJECTS OF THE INVENTION

In view of the foregoing, it is an object of the present invention to provide a fiber optic cable including: an optical ribbon having optical fibers in a common matrix coating, a jacket, and a buffer material between the common matrix coating and the jacket; the buffer material including at least one volume of buffer material defining a stress-cushioning zone between the optical ribbon and the jacket, the stress-cushioning zone being operative to substantially decouple the jacket from the ribbon in the region of the stress-cushioning zone thereby inhibiting the application of stress to the optical ribbon; and the buffer material including at least one volume of material at an intermediate buffer zone held substantially tight against an intermediate portion of the optical ribbon for inhibiting the twisting of the optical ribbon.

It is another object of the present invention to provide a fiber optic cable including: an optical ribbon having optical fibers in a common matrix coating, a jacket, and a buffer material between the common matrix coating and the jacket; volumes of buffer material defining stress-cushioning zones between the optical ribbon and the jacket for avoiding attenuation in the optical ribbon when the cable is stressed; volumes of buffer material defining intermediate buffer zones; and the buffer material being substantially non-uniformly distributed about the optical ribbon such that the volumes of the buffer material in the stress-cushioning zones is substantially different than volumes of the buffering material in the intermediate buffer zones.

BRIEF DESCRIPTION OF THE DRAWINGS

FIG. 1 is a cross sectional view of a fiber optic cable according to the present invention.

FIG. 2 is an isometric view of the fiber optic cable of FIG. 1.

FIG. 3 is a cross sectional view of an alternative fiber optic cable according to the present invention.

FIG. 4 is an isometric view of fiber optic cables according to the present invention connected by a web.

FIG. 5 is a cross sectional view of a fiber optic cable according to the present invention having optical ribbons therein.

FIG. 6 is a cross sectional view of a fiber optic cable according to the present invention.

FIG. 7 is a cross sectional view of a fiber optic cable according to the present invention.

DETAILED DESCRIPTION OF THE INVENTION

Referring to FIGS. 1–2, a fiber optic cable 10 according to the present invention will be described. Fiber optic cable 10 includes an optical ribbon 20, buffer material 30, and a jacket 40. Buffer material 30 defines at least one stress-cushioning-zone between optical ribbon 20 and jacket 40, the stress-cushioning-zone being operative to substantially decouple jacket 40 from optical ribbon 20 in the region of the stress-cushioning-zone thereby inhibiting the application of stress to the optical ribbon. Additionally, buffer material 30 defines at least one intermediate buffer zone held substantially tight against an intermediate portion of optical ribbon 20 for inhibiting the twisting of optical ribbon 20.

Optical ribbon 20 includes optical fibers encased in a common matrix coating. In particular, optical ribbon 20 includes end fibers 22,26 and an intermediate portion 25. In addition, optical ribbon 20 may include notches 28 (FIG. 2) or other means to assist the splitting of an optical ribbon, such as are disclosed in U.S. Pat. No. 5,442,722 and U.S. Pat. No. 5,598,498, the respective disclosures of which are incorporated herein by reference.

Buffer material 30 preferably includes dielectric tensile strength fibers, e.g., aramid, glass, or polyester fibers that substantially surround ribbon 20 and are established in a generally parallel stranding relative to the longitudinal axis of optical ribbon 20. Buffer material 30 includes stress-cushioning zones 32,36 adjacent to end fibers 22,26 of ribbon 20, and includes intermediate buffer zones 35 adjacent intermediate portion 25 of ribbon 20.

Jacket 40 is preferably formed of, for example, a flame retardant PVC or PE material that is flexible but has sufficient hoop strength/shape memory to retain its shape under normal operating conditions. The shape of jacket 40 includes curvilinear buffer walls 42,46 and crests 41,47 formed adjacent to buffer zones 32,36. As shown in FIG. 2, jacket 40 may include a separation means 48 for facilitating removal of jacket 40. As is best shown in FIG. 1, jacket 40 includes generally arcuate intermediate walls 45 formed adjacent to intermediate buffer zones 35. Crests 41,47 are located away from ribbon 20 to a slightly greater degree than intermediate walls 45. The distances between the inner surface of jacket 40 and optical ribbon 20 vary generally, for example: maximum distance regions are generally defined between the inner surfaces of buffer walls 42,46 and the section of ribbon 20 wherein end fibers 22,26 reside; and minimum distance regions are generally defined between inner surfaces of intermediate walls 45 and intermediate portion 25.

As is best shown in FIG. 2, the maximum distance regions generally include a higher volume of buffer material 30, as compared to the volumes of buffer material 30 established in the minimum distance regions. Buffer walls 42,46 and crests 41,47 comprise concave portions of jacket 40 facing optical ribbon 20 that accommodate the buffer material 30 in buffer zones 32,36. Although stress-cushioning zones 32,36 include a significant volume of buffer material 30, the buffer material is generally longitudinally stranded in a way that permits ribbon 20 to move laterally, as indicated by arrows A,B (FIG. 1). Intermediate walls 45 include a generally convex shape facing ribbon 20, respectively sloping from crests 41,47 toward intermediate portion 25 of ribbon 20, thereby defining a relatively tighter spacing between jacket 40 and ribbon 20, as generally indicated at arrows C,D.

During manufacture of cable 10, buffer material 30 is longitudinally paid off adjacent to end fibers 22,26. Some of the buffer material migrates to intermediate buffer zones 35, whereby buffer material 30 substantially surrounds optical ribbon 20. As noted above, the material of jacket 40 is a flexible plastic having shape memory characteristics, and it is extruded about buffer material 30 through a non-round extrusion die that is shaped to define intermediate walls 45, buffer walls 47,46, and crests 41, 47. Where buffer material 30 comprises fibers, it is desirable to have some of the fibers bond to jacket 40 soon after extrusion thereof.

The volume of buffer material 30 in stress-cushioning zones 32,36 is operative to substantially decouple jacket 40 from ribbon 20 during cable bending or thermal cycling thereby inhibiting the application of stress to ribbon 20 and avoiding unacceptable levels of attenuation in the optical fibers thereof, particularly end fibers 22,26. Intermediate walls 45, during bending of cable 10 in a plane generally defined by the plane of ribbon 20, hold intermediate buffer zones 35 substantially tight against intermediate portion 25 for inhibiting the twisting of optical ribbon 20. For example, where cable 10 is bent in the plane of ribbon 20, buffer walls 42,46 will be flexed under tension or compression. Stress-cushioning zones 32,36 define respective cushions between walls 42,46 and optical ribbon 20 which dissipate stress. Additionally, stress-cushioning zones 32,36 permit some degree of lateral movement of optical ribbon 20, and cushion this movement, thereby allowing optical ribbon 20 to slide to a position of minimum stress thus avoiding the application of stress to optical ribbon 20. In other words, by virtue of the cushioning effect of buffer material 30, stress is not transmitted to end fibers 22,26 thereby avoiding unacceptable levels of attenuation in the optical fibers of optical ribbon 20. Where buffer material 30 comprises tensile strength fibers, the tensile strength fibers are capable of performing the dual functions of: (i) longitudinal tensile strength; and (ii) lateral cushioning in stress-cushioning zones 32,36. Additionally, the relatively tight spacing adjacent intermediate walls 45 resists the tendency in optical ribbon 20 to twist during cable bending thereby reducing the likelihood of unacceptable levels of attenuation from twisting of optical ribbon 20.

Due to the flexibility of jacket 40 and/or clearance between optical ribbon 20 and jacket 40, the distribution of buffer material 30 about optical ribbon 20 is variable. For example, some of buffer material 30 in stress-cushioning zones 32,36 may be compelled to migrate, under action of relieving the stress from bending or thermal effects, from stress-cushioning zones 32,36 toward intermediate portion 25 of ribbon 20. In this event, the amount of buffer material 30 in stress-cushioning zones 32,36 is lessened and the amount of buffer material 30 in intermediate buffer zones 35 may increase. However, not all buffer material 30 will migrate, as the buffer material that has bonded to jacket 40 will remain in buffer zones 32,36.

Upon the re-distribution of the volume of buffer material 30, the shape of jacket 40 will change to some extent in conformance therewith, however, the shape memory and hoop strength of the material of jacket 40 maintain the concave and convex profiles thereof.

The present invention may be practiced in the form of exemplary fiber optic cables 60,70,80,90,100. For example, FIG. 3 shows a fiber optic cable 60 wherein fiber optic cable 10 is surrounded by an additional layer of buffer material and an outer cable jacket. Additionally, the present invention may be practiced in the form a multi-unit type cable 70 where fiber optic cables 10 are connected together by a web, for example, a frangible web 72. The present invention may also be practiced in the form of a fiber optic cable 80 having multiple optical ribbons 20 therein. Moreover, the present invention may be practiced in the form of a fiber optic cable 90 having U-shaped carriers 92 which receive a series of stacked fiber optic cables 10 stranded around a central member 94. The present invention may also be practiced in the form of a break-out type cable 100 of the dual layer type wherein fiber optic cables 10 are stranded around a central member 104.

The present invention has thus been described with reference to the foregoing embodiments, which embodiments are intended to be illustrative of the inventive concepts rather than limiting. Persons of skill in the art will appreciate that variations and modifications of the embodiments may be made without departing from the scope of the appended claims. For example, one or more fiber optic cables 10 may be installed in any indoor or outdoor type fiber optic cable, e.g., riser, plenum, mono-tube, or slotted core type cables. Additionally, buffer material 30 may be a filling compound/gel, or a mixture of a filling compound/gel and fibers or fillers. Buffer material 30 substantially surrounds optical ribbon 20 by completely or at least partially circumscribing ribbon 20. Although jacket 40 is shown with generally curvilinear walls, the walls may be adapted to include one or more linear portions as well, as shown by jackets 40' of FIGS. 6–7. Optical cables according to the present invention may include optical ribbons having more or less optical fibers than the number shown in the FIGS.

Accordingly, what is claimed:

1. A fiber optical cable comprising:
   an optical ribbon having optical fibers in a common matrix coating, a jacket, and a buffer material between said common matrix coating and said jacket;
   said buffer material including at least one volume of buffer material defining a stress-cushioning zone between said optical ribbon and said jacket, said buffer material comprising fibers, the fibers performing the dual functions of (i) providing tensile strength for resisting tensile elongations, and (ii) lateral cushioning in the stress-cushioning zone, said stress-cushioning zone being operative to substantially decouple said jacket from said ribbon in the region of the stress-cushioning zone thereby inhibiting the application of stress to said optical ribbon; and said buffer material including at least one volume of material at an intermediate buffer zone held substantially tight, by a non-linear portion of said jacket, against an intermediate portion of said optical ribbon for inhibiting the twisting of said optical ribbon.

2. The fiber optic cable of claim 1, wherein said volume of material at said stress-cushioning zone is substantially larger than the volume of said buffer material of said intermediate buffer zone.

3. The fiber optic cable of claim 1, wherein said buffer material is capable of performing the dual functions of providing longitudinal tensile strength and lateral cushioning in said stress-cushioning zones.

4. The fiber optic cable of claim 1, wherein said jacket includes a linear portion.

5. A fiber optic cable comprising:
an optical ribbon having optical fibers in a common matrix coating, a jacket, and a butter material between said common matrix coating and said jacket;
said optical ribbon having a generally flat shape having at least one generally planar surface generally located between a first and a second end portion;
volumes of buffer material defining stress-cushioning zones between at least one end portion of said optical ribbon and said jacket for avoiding attenuation in the optical ribbon when the cable is stressed, said stress-cushioning zones being operative to substantially decouple said jacket from said ribbon in the region of the stress-cushioning zones thereby inhibiting the application of stress to said optical ribbon; volumes of buffer material defining intermediate buffer zones between said generally planar surface of said optical ribbon and said jacket comprising generally material being generally convex portions facing said optical ribbon;
and said buffer material being substantially non-uniformly distributed about said optical ribbon such that the volume of said buffer material generally increases from at least one of said intermediate buffer zones towards at least one of said stress-cushioning zones.

6. The fiber optic cable of claim 5, wherein said buffer material increases in volume from an intermediate portion of said optical ribbon laterally toward edges of the optical ribbon.

7. The fiber optic cable of claim 5, wherein the volume of said buffer material is generally at a maximum between at least one of said end portions of the optical ribbon and buffer walls of said jacket.

8. The fiber optic cable of claim 5, wherein the volume of said buffer material is generally at a minimum between an intermediate portion of the optical ribbon and intermediate walls of said jacket.

9. The fiber optic cable of claim 5, wherein said stress-cushioning zones are characterized by generally maximum distance regions defined between said jacket and said optical ribbon.

10. The fiber optic cable of claim 5, wherein the buffer material comprises fibers.

11. The fiber optic cable of claim 10, wherein said fibers are generally longitudinally disposed along said optical ribbon.

12. The fiber optic cable of claim 5, wherein said optical ribbon includes at least one notch.

13. The fiber optic cable of claim 5, wherein said jacket includes crests in said jacket adjacent said buffer zones.

14. The fiber optic cable of claim 5, wherein said jacket is non-round and non-oval.

15. The fiber optic cable of claim 5, wherein said jacket includes a separation means.

16. The fiber optic cable of claim 5, wherein said fiber optic cable is frangibly connected to another fiber optic cable.

17. The fiber optic cable of claim 5, wherein multiple optical ribbons are within said jacket.

18. The fiber optic cable of claim 5, wherein said fiber optic cable is stranded around a central member.

19. The fiber optic cable of claim 5, wherein said buffer material is capable of performing the dual functions of providing longitudinal tensile strength and lateral cushioning in said stress-cushioning zones.

20. The fiber optic cable of claim 5, wherein said jacket includes a linear portion.

21. A fiber optic cable comprising:
an optical ribbon having optical fibers in a common matrix coating, a jacket, and a buffer material between said common matrix coating and said jacket;
volumes of buffer material defining stress-cushioning zones between said optical ribbon and said jacket for avoiding attenuation in the optical ribbon when the cable is stressed, said stress-cushioning zones being operative to substantially decouple said jacket from said ribbon in the region of the stress-cushioning zones thereby inhibiting the application of stress to said optical ribbon;
volumes of buffer material defining intermediate buffer zones; and
said jacket being substantially non-uniformly disposed about said optical ribbon such that said jacket adjacent said stress-cushioning zones includes respective crests from which said jacket slopes inwardly toward said intermediate buffer zones.

22. The fiber optic cable of claim 21, wherein said jacket includes generally convex portions facing said optical ribbon.

23. The fiber optic cable of claim 21, wherein said jacket is non-round and non-oval.

24. The fiber optic cable of claim 21, wherein said jacket includes a separation means.

25. The fiber optic cable of claim 21, wherein said fiber optic cable is frangibly connected to another fiber optic cable.

26. The fiber optic cable of claim 21, wherein multiple optical ribbons are within said jacket.

27. The fiber optic cable of claim 21, wherein said fiber optic cable is stranded around a central member.

28. The fiber optic cable of claim 21, wherein said buffer material is capable of performing the dual functions of providing longitudinal tensile strength and lateral cushioning in said stress-cushioning zones.

29. The fiber optic cable of claim 21, wherein said jacket includes a linear portion.

30. A fiber optic cable comprising:
an optical ribbon having optical fibers in a common matrix coating and at least one notch, a jacket, and a buffer material between said common matrix coating and said jacket;
volumes of buffer material defining stress-cushioning zones between said optical ribbon and said jacket for avoiding attenuation in the optical ribbon when the cable is stressed, said stress-cushioning zones being operative to substantially decouple said jacket from said ribbon in the region of the stress-cushioning zones thereby inhibiting the application of stress to said optical ribbon;

volumes of buffer material defining intermediate buffer zones; and said buffer material being substantially non-uniformly distributed about said optical ribbon such that the volume of said buffer material in said stress-cushioning zones is substantially different than the volume of said buffering material in said intermediate zones.

31. The fiber optic cable of claim 30, wherein said fiber optic cable is stranded around a central member.

32. The fiber optic cable of claim 30, wherein the volume of said buffer material is generally at a maximum between end fibers of the optical ribbon and buffer walls of said jacket.

33. The fiber optic cable of claim 30, wherein said stress-cushioning zones are characterized by generally maximum distance regions defined between said jacket and said optical ribbon.

34. The fiber optic cable of claim 30, wherein the buffer material comprises fibers.

35. The fiber optic cable of claim 30, wherein said jacket includes separation means.

36. The fiber optic cable of claim 30, wherein said fiber optic cable is frangibly connected to another fiber optic cable.

37. The fiber optic cable of claim 30, wherein multiple optical ribbons are within said jacket.

38. A fiber optic cable comprising:

a plurality of optical ribbons stacked together, said optical ribbons having optical fibers in a common matrix coating, a jacket, and a buffer material between said common matrix coating and said jacket;

volumes of buffer material defining stress-cushioning zones between said optical ribbons and said jacket for avoiding attenuation in the optical ribbons when the cable is stressed, said stress-cushioning zones being operative to substantially decouple said jacket from said ribbons in the region of the stress-cushioning zones thereby inhibiting the application of stress to said optical ribbons;

volumes of buffer material defining intermediate buffer zones; and said jacket being substantially non-uniformly disposed about said optical ribbons such that said jacket adjacent said stress-cushioning zones includes respective crests, said jacket sloping inwardly toward said intermediate buffer zones.

39. The fiber optic cable of claim 38, wherein said fiber optic cable is stranded around a central member.

40. The fiber optic cable of claim 38, wherein the buffer material comprises fibers.

41. The fiber optic cable of claim 38, wherein said jacket includes separation means.

42. The fiber optic cable of claim 38, wherein said fiber optic cable is frangibly connected to another fiber optic cable.

43. A fiber optic cable comprising:

at least one optical ribbon stranded around a central member and substantially surrounded by an outer jacket;

said at least one optical ribbon having optical fibers in a common matrix coating, an individual jacket, and a buffer material between said common matrix coating and said individual jacket;

volumes of buffer material defining stress-cushioning zones between said at least one optical ribbon and said individual jacket for avoiding attenuation in said at least one optical ribbon when the cable is stressed, said stress-cushioning zones being operative to substantially decouple said individual jacket from said at least optical ribbon in the region of the stress-cushioning zones thereby inhibiting the application of stress to said at least one optical ribbon;

volumes of buffer material defining intermediate buffer zones; and said individual jacket being substantially non-uniformly disposed about said at least one optical ribbon such that said individual jacket adjacent said stress-cushioning zones includes respective crests from which said individual jacket slopes inwardly toward said intermediate buffer zones.

44. The fiber optic cable of claim 43, wherein said individual jacket includes a separation means.

45. The fiber optic cable of claim 43, wherein said individual jacket is frangibly connected to another individual jacket.

46. The fiber optic cable of claim 43, wherein said individual jacket is substantially disposed around multiple ribbons of optical fibers.

47. The fiber optic cable of claim 43, wherein the buffer material comprises fibers.

* * * * *